United States Patent

Hoffman

[15] 3,692,814
[45] Sept. 19, 1972

[54] PREPARATION OF DIPERCHLORATES FROM DIENES AND DIOLS

[72] Inventor: David M. Hoffman, Chester, Pa.

[73] Assignee: Sun Oil Company, Philadelphia, Pa.

[22] Filed: Aug. 21, 1970

[21] Appl. No.: 66,051

Related U.S. Application Data

[63] Continuation-in-part of Ser. No. 24,390, March 31, 1970.

[52] U.S. Cl..................260/453 R, 149/46, 149/61, 149/106, 149/107, 149/109
[51] Int. Cl............................................C07c 71/00
[58] Field of Search..........................260/453 R, 1

[56] References Cited

UNITED STATES PATENTS 3,524,871  8/1970  Matt..........................260/454

OTHER PUBLICATIONS

Showell et al., " The Reaction of Cis–9–Octadecene etc.;" (1967) J. Org. Chem. 34, pp. 1097– 1103 (1969)

Burton et al., " Acylation & Allied Reactions Catalysed by Strong Acids etc.;" (1955) J. Chem. Soc. 1955, pp. 3089– 3092 (1955)

Loudon et al., " O–Hydroxylation of Phenols etc.;" (1950) J. Chem. Soc. 1950, pp. 55– 58 (1950)

Schmitz–Dumont, " Catalytic Polymerization of Ethylene Dees etc.;" (1938) CA 32, pp. 2899– 2901 (1938)

Lorenz et al., " Vinyl Homoloys of Triphenylmethane Dyes" (1945) CA 40, p. 1483 (1946)

Gandini et al., " Interaction Between Perchloric Acid & Styrene etc.;" (1964) CA 61, p. 9582 (1964)

Smith et al., " Mixed Perchloric & Sulfuric Acids etc.;" (1935) CA 30, p. 700 (1936)

Young et al., " Use of Perchloric Acid as an Oxidizing Agent," (1946) CA 43, p. 2436 (1949)

*Primary Examiner*—Lewis Gotts
*Assistant Examiner*—G. Hollrah
*Attorney*—George L. Church, Donald R. Johnson and Wilmer E. McCorquodale, Jr.

[57] ABSTRACT

Hydrocarbon diperchlorates are prepared by contacting certain kinds of feed reactants with perchloric acid in an emulsion comprising a strong sulfuric acid phase and an organic phase comprising an inert organic solvent. The feed reactants can be alkadienes, cycloalkadienes, diols of alkanes or cycloalkanes, and monools of alkenes or cycloalkenes, with certain restrictions on the proximity of the reactive positions. The perchloric acid can be generated in situ in the mixture by reaction of a perchlorate metal salt with the sulfuric acid. The hydrocarbon diperchlorate products have utility as detonatable sensitizers for explosives and as alkylating agents.

18 Claims, No Drawings

PREPARATION OF DIPERCHLORATES FROM DIENES AND DIOLS

CROSS REFERENCE TO RELATED APPLICATION

This application is a continuation-in-part of my copending application, Ser. No. 24,390, filed Mar. 31, 1970, and entitled "Preparation of Organic Perchlorates" which describes and claims the preparation of organic monoperchlorates from alkenes, cycloalkenes, alkanols, cycloalkanols, aralkenes and aralkanols by a procedure which is substantially the same as that used in the present process, except that a lower proportion of perchloric acid to feed reactant can be used in making the monoperchlorate products.

BACKGROUND OF THE INVENTION

This invention relates to the preparation of organic diperchlorates from certain types of hydrocarbons having two olefinic bonds, from certain types of diols or from certain types of monoolefinically unsaturated monools. The products are esters having two perchlorate groups attached to a hydrocarbon moiety. They have explosive characteristics and must be handled with caution.

In the prior art several methods have been shown for the preparation of alkyl or aralkyl perchlorates, and these have been described in a review article entitled "-Perchloric Acid and Some Organic Perchlorates," by Burton et al., ANALYST, 80, pps. 4–15 (1955). One involves the metathetical reaction of an alkyl halide with silver perchlorate according to the equation:

$$RX + AgClO_4 \rightarrow RClO_4 + AgX$$

Another involves the distillation of barium alkyl sulfate with barium perchlorate to effect the following reaction:

$$Ba(RSO_4)_2 + Ba(ClO_4)_2 \rightarrow 2RClO_4 + 2BaSO_4$$

A third known procedure comprises the reaction of diazomethane with perchloric acid in the following manner:

$$CH_2N_2 + HClO_4 \rightarrow CH_3ClO_4 + N_2$$

These procedures are costly and may also be hazardous due to the explosive tendencies of the perchlorate products, and none of them provides a desirable way for the commercial preparation of hydrocarbyl perchlorates. The products of all these reactions are monoperchlorates, and the prior art does not appear to show how hydrocarbon diperchlorates could be formed.

Several references cited in the aforesaid review article show that hydrocarbyl perchlorates can be used as alkylating agents to alkylate such materials as benzene, toluene, phenol and anisole.

DESCRIPTION OF THE INVENTION

The present invention provides a facile way of producing hydrocarbon diperchlorates from alkadienes, cycloalkadienes, alkanediols, cycloakanediols, alkenylols and cycloalkenylols of the classes hereinafter defined. The reaction is carried out in an emulsion containing an inert solvent and the diperchlorate products are preferably recovered as solutions in the solvent rather than as isolated compounds. The diluent effect of the inert solvent reduces the explosive tendencies of the diperchlorates and makes them more readily handleable.

The process according to the invention comprises contacting a feed reactant, as hereinafter specified, with perchloric acid in an emulsion comprising a sulfuric acid phase having a strength in the range of 80–101 percent by weight $H_2SO_4$, more preferably 90–100 % $H_2SO_4$, and an organic phase comprising an inert organic solvent. The contacting of these materials is carried out at a reaction temperature above the freezing point of the acid phase but below 75° C. and usually below 35° C. In many cases the reaction occurs almost instantaneously to form the hydrocarbon diperchlorate product which is soluble in the solvent phase. Contacting of the phases preferably is stopped and the phases are separated as soon as the reaction has occurred, since the diperchlorate products tend to be unstable in the presence of the acid phase.

As a specific illustration of the process utilizing 1,7-cyclododecadiene as the feed reactant, an emulsion comprising 15 volumes of n-pentane as inert solvent, 30 volumes of sulfuric acid of 96 percent strength and four volumes of 70 percent (by weight) aqueous perchloric acid is stirred at −5° C. and one volume of this diene is added to the mixture. The reaction is essentially complete as soon as the cyclododecadiene has been thoroughly mixed into the emulsion. The reaction that occurs is illustrated in Equation I.

I

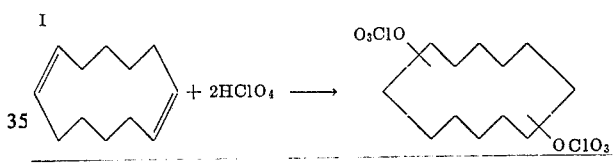

The cyclododecane diperchlorate product is a mixture of isomers and typically is obtained in a yield of 70 percent or more of the theoretical yield.

As another specific illustration using an alkenylol, a mixture of 15 ml. of cyclopentane as inert solvent, 35 ml. of 96 percent $H_2SO_4$ and 4 g. of lithium perchlorate is stirred at about −10° C., and to the agitating mixture 1.0 ml. of 7-hydroxyoctene-1 is added. The lithium perchlorate reacts with sulfuric acid to form perchloric acid in situ and the latter immediately reacts with the alkenylol as shown in Equation II.

II

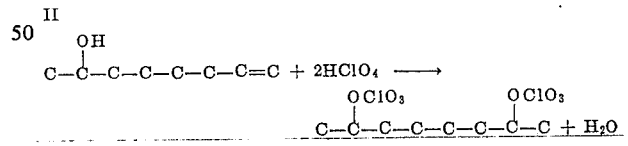

As shown in the equation, the alkenylol feed converts to hydrocarbon diperchlorate. For convenience the product is shown as the 2,7-diperchlorate, but actually a mixture of isomers is formed with the 2,7-derivative tending to predominate. However, essentially none of the product contains a perchlorate group at a primary position.

As a third specific illustration of the process employing a cycloalkanediol, when 4-(3-hydroxycyclohexyl)-2-hydroxybutane is substituted for cyclododecadiene in the first illustration above and the process otherwise is carried out under the same conditions, the reaction shown in Equation III occurs:

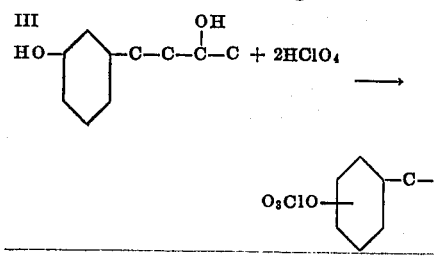

$$+ 2HClO_4 \longrightarrow$$

[structure with $OClO_3$ and $O_3ClO$] $+ 2H_2O$

The diperchlorate product is a mixture of isomers and is obtained in about the same yield as in the case of cyclododecadiene, i.e., 70 percent or higher.

The sulfuric acid in the reaction mixture should have a strength in the range of 80–101% $H_2SO_4$ by weight and preferably has a strength in the range of 90–100% $H_2SO_4$. The term "strength" as herein used is calculated taking into account only the total water and the total $H_2SO_4$ on a weight basis in the reaction mixture. In the case of fuming sulfuric acid corresponding to strengths in the range of 100–101%, the strength corresponds to the total $H_2SO_4$ equivalent.

The perchloric acid for the reaction can be added to the mixture as such, e.g. as 70 percent aqueous perchloric acid which is available commercially, or it can be generated in situ by adding a metal perchlorate salt, such as an alkali metal or alkaline earth metal perchlorate, which reacts with the sulfuric acid to form perchloric acid. When a salt is used for this purpose, lithium perchlorate is particularly suitable since it generally reacts with the sulfuric acid more rapidly than other metal perchlorate salts.

The solvents used to form the organic phase of the reaction mixture should be capable of dissolving the diperchlorate products formed, be essentially inert in the reaction mixture and of course be liquid at the reaction temperature selected. The preferred solvents are saturated hydrocarbons including paraffins and naphthenes. The following are illustrative examples: n-butane; isobutane; n-pentane; isopentane; cyclopentane; n-hexane; isohexanes; methylcyclopentane; heptanes, methylcyclohexane; octanes; dimethylcyclohexane; decanes; tetrahydronaphthalene; methyltetrahydronaphthalenes and the like.

Numerous halohydrocarbons can also be used as the inert solvent. These include halobenzenes having one to two halogen atoms, halomethanes and haloethanes having one to five halogen atoms in which the halogen is chlorine and/or fluorine. Illustrative examples are: chlorobenzene; ortho- and meta-dichlorobenzenes or difluorobenzenes; methylene chloride; methyl chloroform; 1,1,2-trichloroethane; 1,1,2,2-tetrachloroethane; trifluoroethanes; chlorodifluoroethanes; tetrafluoroethanes and pentachloroethane.

The types of compounds that can be used as feed reactants for the process are non-conjugated alkadienes and cycloalkadienes, alkanediols and cycloalkanediols with certain limitations as to the positioning of hydroxy groups, and alkenylols and cycloalkenylols also with certain limitations respecting the hydroxy group position. More specifically the feed compounds are of the following classes:

(a) $C_5$–$C_{30}$ non-conjugated alkadienes,
(b) $C_6$–$C_{30}$ non-conjugated cycloalkadienes,
(c) $C_7$–$C_{30}$ alkanediols in which the two hydroxy groups are attached to non-primary carbon atoms separated by at least three other carbon atoms,
(d) $C_8$–$C_{30}$ cycloalkanediols in which the two hydroxy groups are attached to non-primary carbon atoms separated by at least three other carbon atoms,
(e) $C_6$–$C_{30}$ alkenylols in which the hydroxy group is attached to a non-primary carbon atom separated by at least two carbon atoms from the nearest carbon atom sharing the olefinic bond, and
(f) $C_7$–$C_{30}$ cycloalkenylols in which the hydroxy group is attached to a non-primary carbon atom separated by at least two carbon atoms from the nearest carbon atom sharing the olefinic bond.

The non-cyclic compounds of classes (a), (c) and (e) can be straight chain or branched and can contain the olefinic bonds and/or hydroxy groups at any positions provided that they conform to the definitions set forth above. The cyclic compounds of classes (b), (d) and (f) can contain any number of rings consistent with the carbon atom range specified, which rings can be fused or non-fused or both, and also can contain one or more substituent groups or side chains attached to the rings; and again the olefinic bonds and/or hydroxy groups can be at any positions in the rings or side chains or both provided that the compounds conform to the definitions given above. For the cyclic feed compounds it is preferable that each ring have at least five carbon atoms therein, since $C_3$ and $C_4$ rings tend to be unstable under the conditions of the reaction.

Examples of class (a) reactants are as follows: pentadiene-1,4; hexadiene-1,5; 2-methyl or 3-methylhexadiene-1,5; octadiene-2,6; dimethyldecadienes-1,9 or 1,6 or 2,6 or 3,7; and any higher non-conjugated alkadienes up through triacontadienes.

Cycloalkadienes of class (b) are illustrated by the following compounds: 3-(2-cyclopentyl)propene-1; 3-vinylcyclohexene-1; 4-ethylidenecyclohexene-1; norbornadiene-2,5; dicyclopentadiene-2,8; limonene; 5-(3-cyclohexyl)hexene-2; 1,6-(3,3'-dicyclohexenyl)hexane; non-conjugated hexahydronaphthalenes or decahydroanthracenes or tetradecahydrochrysenes; 3,3'-bicyclo-hexenyl; dioctenyl-decahydronaphthalenes; and the like.

Examples of the alkanediols of class (c) are: heptandiol-2,6-; decanediol-2,6 or -2,8 or -3,7; 2,11-dimethyldodecane diol-2,11; eicosanediol-3,10; triacontanediol-2,29; and 4,4-diethylnonanediol-2,8.

The class (d) cyclic diols are exemplified by the following: 1,5-dihydroxycyclooctane; 1,7-dihydroxycyclododecane; 2,7-dihydroxydecahydronaphthalene; 4,4'-bicyclohexyldiol; 8-(2-hydroxycyclopentyl)-2-hydroxyoctane; 1,18-dicyclohexyl-4,12-dihydroxyoctadecane; 1,6-dihydroxyperhydrobenzonaphthene; and bis(4-hydroxycyclohexyl)-bis(cyclohexyl)methane.

The feed reactants of classes (e) and (f) have one olefinic bond and one hydroxy group which must be attached to carbon atoms that are separated from each other by at least two other carbon atoms. The olefinic bond can be at any position, either in a ring or chain, and the hydroxy group can be attached to any carbon atom that is sufficiently removed from the double bond except a primary carbon atom. A few examples of such alkenylols are: 5-hydroxyhexene-1; 8-hydroxydecene-1; 6-hydroxyl-3,3,6-trimethylheptene-1; 12-hydroxyhexadecene-2; 4-hydroxycyclohexylcyclohexene-3; 2-hydroxy-7-(3-butenyl)decahydronaphthalene; and 4-n-hexyl-5-(4-hydroxypentyl)cyclohexene.

For any of these classes of feed materials, reactants having not more than 20 carbon atoms per molecule generally are preferred.

The preferred procedure for carrying out the reaction comprises first establishing an emulsion of (1) an acid phase composed of sulfuric acid of strength as previously specified, preferably 90–100% $H_2SO_4$, and perchloric acid, and (2) an organic phase composed of the inert solvent. The temperature of the emulsion is adjusted to the desired level, and while the emulsion is being agitated the feed reactant is added. The amount of perchloric acid provided in the mixture is at least that stoichiometrically required for producing the desired hydrocarbon diperchlorate, and usually an excess amount is used such that the molar ratio of perchloric acid to reactant is in the range of 2:1 to 6:1. The weight ratio of sulfuric acid to perchloric acid in the initial mixture is not critical and can vary widely, typically being in the range of 5:1 to 20:1. The feed reactant, especially in the case of reactants having an olefinic bond, preferably is added slowly while agitating the mixture thoroughly in order to prevent side reactions that can occur if perchloric acid is not available at the locus where the reaction is taking place. After addition of the feed reactant, stirring of the mixture should be continued only until an optimum yield of hydrocarbon diperchlorate has been obtained. Since the diperchlorate products tend to be unstable in the presence of the sulfuric acid, it is best to separate the phases as soon as the optimum yield has been reached. The time required for this depends largely upon the particular feed reactant charged, the strength of the sulfuric acid and the reaction temperature employed.

The process can also be carried out by first forming an emulsion of the sulfuric acid, inert organic solvent and the feed reactant and thereafter adding perchloric acid or a metal perchlorate salt to form perchloric acid in situ. However, this procedure is less preferable since the reactant may undergo other reactions (e.g., polymerization) yielding undesired products before the perchloric acid is added. In cases when this procedure is employed, a low reaction temperature should be used and the perchloric acid or perchlorate salt should be added to the mixture immediately after the feed has been added to minimize these undesired reactions.

The temperature for carrying out the process can range from just above the freezing point of the acid phase up to 75° C. but temperatures below 35° C. generally are preferred. Elevated temperatures may increase the danger due to the explosive character of hydrocarbon diperchlorates, as well as promote rapid decomposition of these products in contact with the acid phase. The optimum temperature level may vary depending upon the particular feed reactant used. Reactants of the several types having less than ten carbon atoms per molecule generally give substantially better product yields at temperatures below 10° C., whereas higher molecular weight reactants usually give about the same yields at these low temperatures as at room temperature. The monool and diol reactants tend to perform in more or less the same fashion as the alkadienes and cycloalkadienes having corresponding numbers of carbon atoms and skeletal structures, since the hydroxy-substituted sites function as precursors for the formation of corresponding double bonds by a dehydration reaction.

The yield of diperchlorate products from the various types of reactants depends upon how close the two reactive sites are to each other. For example, with dienes as reactants, if the double bonds are close to being in the conjugated position, they tend to isomerize into conjugation and this leads to undesirable side reactions such as polymerization. An increase in reaction temperature promotes such double bond isomerization and thus can have an adverse effect upon the yield of desired diperchlorate products. Consequently, the closer the olefinic double bonds initially are to the conjugated position, the more will be the benefit derived from using a low reaction temperature. When the olefinic bonds initially are remote from each other in the molecule, isomerization thereof to a conjugated relationship does not occur and better yields of the desired diperchlorates are obtained. Also in such cases the temperature does not have any large influence on the diperchlorate yield.

A similar effect on yield is experienced due to the degree of proximity of the reaction sites to each other when the starting material contains one or two hydroxy groups. These, in effect, are precursors for the formation of olefinic bonds as mentioned above. Hence each hydroxy group should be positioned far enough away from the other reactive site to avoid the formation of conjugated intermediates; otherwise side reactions will occur causing low yields of the desired diperchlorate products. For the alkenylol reactants at least two carbon atoms, and preferably more, should occur between the carbon atom to which the hydroxy group is attached and the nearest carbon atom sharing the olefinic bond. For the diol reactants at least three carbon atoms, and preferably more, should be positioned between the two carbon atoms to which the hydroxy groups are attached.

A feed reactant which does not contain any tertiary carbon atom generally gives higher yields of diperchlorate products than those containing one or more tertiary carbons. Consequently, those reactants which are unbranched alkadienes, alkenylols and alkanediols and those which are unsubstituted cycloalkadienes, cycloalkenylols and cycloalkanediols are preferred starting materials. On the other hand, a feed reactant containing a tertiary carbon atom which is sufficiently spaced from the two reactive sites also will give good yields of diperchlorate products and the yields tend to improve in proportion to the degree of spacing. For example, a branched alkadiene in which the olefinic bond and the nearest branch are relatively remote from each other (e.g., 10-methylundecadiene-1,5) will perform in the reaction in about the same fashion and give about the same diperchlorate yield as the straight chain alkadiene having the same number of carbon atoms and double bond spacing (dodecadiene-1,5).

The perchloration reaction occurs in the acid phase. Consequently the feed material, in order to react, must diffuse into and be dissolved in the acid; and once it has entered this phase, both reactive sites undergo reaction before the product transfers into the solvent phase. Thus no monoperchlorates are produced in the reaction.

The hydrocarbon diperchlorate products of the process are present in the solvent phase after the reaction has taken place and are recovered in diluted form merely by separating the phases. If desired, the solvent phase can be washed with water to remove any residual acid. Usually it is desirable not to remove the solvent, or alternatively to remove only part of it for recycling, since presence of the solvent negates or reduces the explosive tendencies of the diperchlorate products. In cases where it is desired to remove all of the solvent, this should be done under reduced pressure in order to avoid handling of the diperchlorates at elevated temperature. As an alternative procedure, a low boiling material such as isobutane or n-butane can be used as the solvent, in which case the diperchloration reaction can be carried out under pressure to keep the solvent liquid, and following the reaction evaporation of it from the diperchlorate product can be done at atmospheric pressure. The hydrocarbon diperchlorates, in the absence of any solvent, vary in character from oily liquids to solid materials depending on the size and structure of the hydrocarbyl moiety.

The hydrocarbon diperchlorates in solvent solution, as recovered from the present process, can be utilized in that form to provide detonatable sensitizers for conventional explosives, such as compositions containing ammonium nitrate, sodium nitrate, dinitrotoluene and/or trinitrotoluene. The use of sensitizers for explosives is known, as can be seen by reference to ENCYCLOPEDIA OF CHEMICAL TECHNOLOGY, Kirk-Othmer, 2nd Ed., Vol. 8, pps. 643–644. After addition of the diperchlorate solution to the explosive material, the solvent can, if desired, be evaporated under reduced pressure, leaving the diperchlorate sensitizer well dispersed throughout the mixture. The diperchlorate products, dissolved in the inert solvent, can also be utilized for alkylating aromatic compounds in the manner shown for monoperchlorates in references listed in the aforesaid review article.

In the following discussion numerous specific examples are given which illustrate the invention. In these examples the yield of hydrocarbon diperchlorate products was determined by analyzing samples of the solvent layer by a colorimetric procedure and calculating the yield (based on theory) from the total amount of diperchlorate indicated. This procedure is a modification of that described by Bodenheimer and Weiler, BULL. RESEARCH COUNCIL Israel, 4, 316 (1954): C.A., 49, 13022–23 (1955); which compares (1) the color developed by reacting a standard aqueous solution of cupric nitrate and pyridine with a test sample containing perchlorate material with (2) the colors of known reference standards. The modification involves utilizing in place of the standard aqueous solution an ethanolic solution of cupric nitrate and pyridine containing sufficient ethanol to solubilize the sample of solvent layer to be tested. Analyses by the modified method were proved to be accurate by comparison with known perchlorate solutions in ethanol and also by comparison with NMR analyses.

EXAMPLES 1–12

Twelve runs were made in substantially the same manner, except that there were some variations in the amounts of solvent and perchloric acid used and also in the reaction temperature, as indicated in the accompanying table. In each of these runs an emulsion was prepared by mixing 30 ml. of 96 percent sulfuric acid, from 2–5 ml. of aqueous perchloric acid (70% $HClO_4$ by weight) and either 15 or 30 ml. of hexane as solvent. The mixture was cooled to a temperature in the range of 0° to −15° C. and 1.0 ml. of the selected feed reactant was added over a time of 5 minutes. The phases were then separated, a sample of the solvent phase was analyzed for perchlorate content by the modified colorimetric method and the yield based on theory was calculated.

The accompanying table presents the results for the various runs. Runs 1–7 were made with feed reactants which were non-cyclic dienes, while Runs 8–10 are for cyclic diene feeds. The feed materials in Runs 11 and 12 were alkanediols.

TABLE

Diperchloration of Dienes and Diols

| Run No. | Feed Reactant | Vol. Used, ml. $HClO_4$ (70%) | Hexane | Approximate Reaction Temp. °C. | Diperchlorate Yield, % |
|---|---|---|---|---|---|
| Non-cyclic Dienes: | | | | | |
| 1 | hexadiene-1,5 | 4.0 | 15 | −10 | 27 |
| 2 | hexadiene-1,5 | 6.0 | 30 | −10 | 45 |
| 3 | octadiene-1,7 | 2.0 | 15 | −10 | 63 |
| 4 | octadiene-1,7 | 4.0 | 30 | −10 | 91 |
| 5 | 2,5-dimethylhexadiene-1,5 | 2.0 | 15 | −10 | 45 |
| 6 | dodecadiene-1,11 | 5.0 | 15 | −10 | 82 |
| 7 | dodecadiene-1,11 | 5.0 | 15 | −15 | 98 |
| Cyclic Dienes: | | | | | |
| 8 | 1-methyl-4-isopropenyl-cyclohexene | 5.0 | 15 | 0 | 10 |
| 9 | norbornadiene-2,5 | 6.0 | 15 | −15 | 15 |
| 10 | guaiene** | 5.0 | 15 | −10 | 33 |
| Diols: | | | | | |
| 11 | 2,5-hexanediol* | 5.0 | 15 | −15 | 4–5 |
| 12 | 2,11-dodecanediol* | 5.0 | 15 | 0 | 81 |

\* Added as an ethanolic solution

\*\* Guaiene structure:

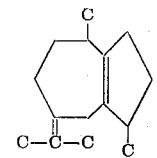

The tabulated results show that hydrocarbon diperchlorates can be made from any of the feed materials used, although the yield may vary considerably depending upon the specific starting material selected and the conditions under which the reaction is effected. None of the products in these runs contained monoperchlorate material, which circumstance is typical for reactions made according to the present invention.

Comparison of the data presented indicate that the yield of diperchlorate products tends to improve as the spacing between the two reactive sites in the starting material increases. This can readily be seen for the alkadienes by comparing, for example, Runs 1 and 4 wherein the feed materials had, respectively, two and four carbon atoms between the double bond carbon atoms, or for the alkanediols by comparing Runs 11 and 12. Although Run 11 was run at a temperature 15° lower than Run 12 in an attempt to favor diperchlorate production, nevertheless little yield of the diperchlorate product was obtained in Run 11 because of the proximity of the two hydroxy groups in the molecule. This illustrates the fact that diols used as feed should have the hydroxy groups attached to carbon atoms separated by at least three other carbon atoms and preferably by more than three.

Runs 8-10 show that cyclic dienes will yield diperchlorates under the conditions herein described. High yields were not secured in these runs, however, probably due both to the adverse effect of tertiary carbon atoms and relative nearness in spacing between double bonds in the molecules.

Generally analogous results are obtained when other feed materials of the above-described classes (a), (b), (c), (d), (e) and (f) are substituted for the feed compounds used in the foregoing runs. Substantially equivalent results are also obtained when the perchloric acid is generated in situ in the reaction mixture from a metal perchlorate salt instead of being supplied as aqueous $HClO_4$.

The invention claimed is:

1. Process of preparing hydrocarbon diperchlorate which comprises contacting a feed reactant with perchloric acid in an emulsion comprising a sulfuric acid phase having a strength in the range of 80-101% by weight $H_2SO_4$ and an organic phase comprising an inert organic solvent selected from saturated hydrocarbon and halohydrocarbon solvents, the molar ratios of perchloric acid to the feed reactant being at least 2:1, said feed reactant being selected from

| | | |
|---|---|---|
| (a) | $C_5$–$C_{30}$ | non-conjugated alkadienes, |
| (b) | $C_8$–$C_{30}$ | non-conjugated cycloalkadienes, |
| (c) | $C_7$–$C_{30}$ | alkanediols in which the two hydroxy groups are attached to non-primary carbon atoms separated by at least three other carbon atoms, |
| (d) | $C_8$–$C_{30}$ | cycloalkanediols in which the two hydroxy groups are attached to non-primary carbon atoms separated by at least three other carbon atoms, |
| (e) | $C_6$–$C_{30}$ | alkenylols in which the hydroxy group is attached to a non-primary carbon atom separated by at least two carbon atoms from the nearest carbon atom sharing the olefinic bond, and |
| (f) | $C_7$–$C_{30}$ | cycloalkenylols in which the hydroxy group is attached to a non-primary carbon atom separated by at least two carbon atoms from the nearest carbon atom sharing the olefinic bond, | said contacting being at a reaction temperature above the freezing point of the acid phase but below 75° C. and thereafter separating the acid phase from an organic phase containing hydrocarbon diperchlorate.

2. Process according to claim 1 wherein said strength is in the range of 90–100 percent by weight $H_2SO_4$.

3. Process according to claim 2 wherein said feed reactant is a diene hydrocarbon of the classes defined in (a) and (b).

4. Process according to claim 3 wherein said temperature is below 35° C.

5. Process according to claim 4 wherein said feed reactant is an alkadiene or cycloalkadiene having not more than 20 carbon atoms per molecule.

6. Process according to claim 5 wherein the feed reactant is an unbranched alkadiene.

7. Process according to claim 5 wherein the said temperature is below 10° C.

8. Process according to claim 7 wherein the feed reactant in an unbranched alkadiene.

9. Process according to claim 2 wherein said feed reactant is an alkenylol of the classes defined in (e) and (f).

10. Process according to claim 2 wherein said feed reactant is a diol of the classes defined in (c) and (d).

11. Process according to claim 2 wherein said temperature is below 35° C.

12. Process according to claim 11 wherein said feed reactant is a diol having not more than 20 carbon atoms per molecule.

13. Process according to claim 12 wherein said feed reactant is an unbranched alkanediol.

14. Process according to claim 12 wherein said temperature is below 10° C.

15. Process according to claim 1 wherein the feed reactant is an unbranched alkadiene or cycloalkadiene.

16. Process according to claim 15 wherein the temperature is below 10° C.

17. Process according to claim 15 wherein the feed reactant is an unbranched alkadiene having not more than 20 carbon atoms per molecule.

18. Process according to claim 1 wherein the feed reactant is an unbranched alkanediol having not more than 20 carbon atoms per molecule and said temperature is below 10° C.

* * * * *